United States Patent [19]

Furlan et al.

[11] Patent Number: 5,205,975
[45] Date of Patent: * Apr. 27, 1993

[54] PROCESS FOR PRODUCING LARGE-SIZE FORMED ARTICLES CONSISTING OF A MODIFIED POLYAMIDE

[75] Inventors: Piero Furlan, Treviso; Sergio Tonti; Gianpietro Talamini, both of Mestre, Venzia, all of Italy

[73] Assignee: Montedipe S.r.l., Milan, Italy

[*] Notice: The portion of the term of this patent subsequent to Jul. 3, 2007 has been disclaimed.

[21] Appl. No.: 501,477

[22] Filed: Mar. 30, 1990

[30] Foreign Application Priority Data

Mar. 31, 1989 [IT] Italy .................. 19972 A/89

[51] Int. Cl.⁵ ............... C08G 69/20; B29C 41/04
[52] U.S. Cl. .................. 264/240; 264/310; 264/328.6; 264/328.18; 264/331.12; 264/331.19; 264/DIG. 61; 264/DIG. 56; 525/420; 528/315; 528/323; 528/326
[58] Field of Search ........ 264/328.17, 328.18, 264/331.12, 331.15, 331.19, 328.6, 240, 37, 299, 310, DIG. 61, DIG. 56; 528/315, 312, 323, 326; 525/420, 408

[56] References Cited

U.S. PATENT DOCUMENTS

| | | | |
|---|---|---|---|
| 4,022,719 | 5/1977 | Okuyama et al. | 41/51 |
| 4,182,843 | 1/1980 | Haupt et al. | 264/331.19 |
| 4,490,520 | 12/1984 | Ogasa et al. | 528/315 |
| 4,582,879 | 4/1986 | Frisch et al. | 264/331.19 |
| 4,617,355 | 10/1986 | Gabbert et al. | 525/420 |
| 4,691,004 | 9/1987 | Nishiyama et al. | 525/420 |
| 4,732,919 | 3/1988 | Grigsby, Jr. et al. | 521/167 |
| 4,764,537 | 8/1988 | Horn et al. | 264/51 |
| 4,808,636 | 2/1989 | Saito et al. | 264/328.1 |
| 4,939,234 | 7/1990 | Tonti et al. | |
| 4,940,773 | 7/1990 | Tonti et al. | 528/315 |

FOREIGN PATENT DOCUMENTS 324432 7/1989 European Pat. Off. .

Primary Examiner—Jeffery Thurlow
Assistant Examiner—Mathieu Vargot
Attorney, Agent, or Firm—Morgan & Finnegan

[57] ABSTRACT

A process for producing large-size formed articles consisting of a modified polyamide, by polymerization of a mixture containing, besides the omega-lactam corresponding to the polyamide, the following reagents:

a) a polymerization catalyst selected from the sodium salt and the potassium salt of said omega-lactam;
b) a polyoxyalkylene polyamine having a molecular weight ranging from 400 to 5,000 and an amine functionality ranging from 1.9 to 2.5;
c) an activator consisting of a polyisocyanate having all the isocyanic groups blocked with a lactam;

said reagents being fed, at a temperature of from 105° to 125° C., to a mold heated to 130°-170° C.

24 Claims, No Drawings

PROCESS FOR PRODUCING LARGE-SIZE FORMED ARTICLES CONSISTING OF A MODIFIED POLYAMIDE

BACKGROUND OF THE INVENTION

1. Field of the Invention

The invention relates to a process for producing large size formed articles consisting of a modified polyamide by means of anionic polymerization of an omega-lactam, said articles being obtained according to the casting or rotational moulding technologies (see for example NYLON PLASTICS, edited by M. I. KOHAN; John Wiley and Sons Publishers; 1973).

2. Discussion of the Prior Art

The anionic polymerization of an omega-lactam in a mold (according to the casting or rotational moulding technology) is a technique which permits to obtain articles of great dimensions and variable thickness, which otherwise would be difficult and not profitable to obtain by means of the conventional techniques based on the extrusion or injection of the polyamide granules. In fact, it is possible to take advantage of the possibility of filing the mould with a low-viscosity liquid mixture (molten omega-lactam+catalyst+activator) and therefore it is possible to operate with lower injection pressures, with simplier moulds and with a shorter filling time, even if the moulds have great dimensions and complex shapes. The resulting polyamide has, in comparison with the hydrolytic polyamide usually produced and used in granules, a higher molecular weight (and a higher crystallinity) and exhibits a higher modulus, a higher chemical stability to the solvents, a lower permeability to the gases and a lower moisture absorption, what results in a higher dimensional stability. The anionic polymerization process is well suited to the modification in situ of the polyamide with proper elastomerizing agents, during the formation of the polymer, increasing the impact strength thereof. The polymer so obtained shall possess, however, not only a high impact strength (resilience), but also a good homogeneity in every point of the manufactured article, no matter how great are the dimensions, as well as smooth, bright and aesthetically valid surfaces.

DISCLOSURE OF THE INVENTION

The Applicant has now found that it is possible to produce, by means of the casting technology or rotational moulding technology, formed articles of great sizes and thickness (homogeneous in all their points and with a low content of residual monomer), having a wider range of mechanical properties, which even better meet the applicative requirements both as finished articles and as semifinished articles.

In its broadest aspect, the invention relates to a process for the production for the production of large-size articles, consisting of modified polyamide, by means of polymerization, according to the casting technology or to the rotational moulding technology, of a mixture containing, besides the omega-lactam corresponding to the polyamide, the following reagents:
a) a polymerization catalyst selected from the sodium and potassium salts of said omega-lactam and the relevant mixtures;
b) a polyoxyalkylene polyamine, as an elastomerizing agent, having a molecular weight ranging from 400 to 5,000 and an aminic functionality substantially ranging from 1.9 to 2.5;
c) an activator consisting of a polyisocyanate having all the isocyanic groups blocked with a lactam;
said reagents being fed, at a temperature from 105° to 125° C., to a mould heated to a temperature of from 130° to 170° C., preferably from 130° to 160° C.

By the process according to the invention it is possible to obtain formed articles of excellent quality, which exhibit smooth, bright and aesthetically valid surfaces and furthermore:
a full homogeneity in all points, both inside and outside, no matter how great are the thicknesses and the other dimensions (in particular, it was possible to produce cylindrical bodies, for examples pulleys, having a diameter up to 1 meter and pipings long up to 6 meters);
extremely low residual monomer contents (the residual monomer involves an undesirable transudation and a harmful plasticizing of the final product);
a very high resiliency (also exceeding 425 or even 500 J/m) and a very high rigidity (high values of the flexural elastic modulus, also exceeding 1250 or even 1500 MPa);
an excellent compressive strength (also up to 40 MPa, with a consequent deformation of 2.5%) and a good HDT (equal to or higher than 60° C.).

Useful omega-lactams according to the invention can be of different type, for example: gamma-butyrolactam, delta-valerolactam, epsilon-caprolactam, omega-enantholactam, omega-capryl-lactam, omega-undecanolactam and omega-lauryl-lactam, either individually or in combination with one another, particularly preferred being epsilon-caprolactam, omega-lauryl-lactam and mixtures thereof.

The catalysts to be utilized according to the invention are the alkali lactamates; it is preferable to use sodium lactamate or potassium lactamate. Usually, a solution at 15-25% by weight of sodium or potassium lactamate in omega-lactam is utilized; the catalyst amount can generally range from 0.1 to 2 moles per 100 moles of (total) omega-lactam and preferably from 0.20 to 1.5 moles per 100 moles.

The polyoxyalkylene polyamines to be used as an elastomeric modifier have an aminic functionality from 1.9 to 2.5; they are preferably utilized in amounts from 1% to 60% (preferably from 3% to 40% and even better from 5 to 25%) by weight referred to the total reagent amount. Said polyoxyalkylene polyamines can be prepared, for example, by amination with $NH_3$ of the corresponding polyoxyalkylene glycols and are broadly available on the market. Particularly preferred are polyoxypropylene diamines and polyoxytetramethylene diamines; particularly advantageous results are obtained by using polyoxypropylene diamines having a molecular weight ranging from about 400 to about 4,000, such as for example the products which are commercially known as JEFFAMINE ® D 2000 or JEFFAMINE ® D 4000, marketed by Texaco Chemical Company.

The polyisocyanates to be used as activators according to the invention, after blocking with omega-lactam, can be aliphatic, cycloaliphatic or aromatic, such as e.g.: hexamethylene diisocyanate (HDI), optionally biuretized; methylene-bis(phenyl isocyanate) (MDI), optionally biuretized; HDI isocyanurate; mixtures thereof etc. HDI isocyanurate leads to markedly better results as compared with the other activators.

The concentration of the (blocked) -NCO groups generally ranges from 0.2 to 15 equivalents per 100 moles of total omega-lactam, and preferably from 1 to 10 equivalents. The activator (blocked diisocyanate) amount is proportional to the polyoxyalkylene polyamine amount and such that the total number of (blocked) NCO equivalents is at least equal to the total number of the NH$_2$ groups (equivalents) which are present in the system (by addition of polyoxyalkylene polyamine). Generally, the ratio between total number of (blocked) -NCO equivalents and total number of NH$_2$ equivalents is higher than 1, preferably it ranges from 1 to 3 and even more preferably from 1.5 to 2. As a function of the ratio between (blocked) polyiocyanate and modifier (polyoxyalkylene polyamine), as well as of the operative conditions it is possible to obtain a copolymer having a repeating block structure (for example polyamide+polyoxyalkylene-polyaminic elastomerizing segment) or a mixture of homopolymer and copolymer with alternated repeating segments. When the molar ratio (blocked NCO/NH$_2$) is higher than 1, an improvement in the physical properties of the copolymer occurs. When the ratio is higher than 1.5, a by far higher resiliency than the one of the non-modified polyamide it obtained; with 20% by weight of JEFFAMINE ® D 2000, for example, the resiliency (Izod, determined on notched bar) can reach 500 J/m, without any too strong reduction of the flexural modulus value (exceeding 1000 and even 1250 MPa). The amount of alkaline lactam (catalyst) having a group (NM), where M is an alkaline ion, and the amount of polyiocyanate having all the groups (NCO) blocked (activator) are in general such that the equivalent ratio:

$$\frac{(NCO)}{(NM)}$$

is higher than 1, preferably it ranges from 1 to 40 and more preferably from 1.5 to 15. The equivalent ratio:

$$\frac{(NCO) - (NH_2)}{(NM)}$$

is generally higher than 0.01 and preferably it ranges from 0.01 to 20.

Generally, the products prepared according to the invention have excellent color characteristics and exhibit a yellow index, determined according to ASTM D 1925-70 standards, not higher than −10 and preferably not higher than −15.

The formulation components can be mixed with one another before being introduced into the mould, where polymerization and subsequent crystallization take place. However, as an alternative, it is preferable to distribute the components among two feeding tanks, one of which contains a part of the omega-lactam and the activator, while the other contains the remaining amount of omega-lactam along with the catalyst. Polyoxyalkylene polyamine can be put indifferently into either of the tanks, depending on the global process scheme. According to a first scheme, activator, omega-lactam and polyoxyalkylene polyamine are mixed and molten, at a temperature equal to or higher than 105° C., and to the resulting mixture the catalyst, dissolved in molten omega-lactam was added; the temperature of the mould was then brought to a value not lower than 130° C. According to a second scheme, to the activator, dissolved in the molten omega-lactam, a mixture of polyoxyalkylene polyamine with the molten omega-lactam and with the catalyst was added at a temperature equal to or higher than 105° C.; the temperature of the mould was then brought to a value not below 130° C. The temperature of the flows generally varies from 105° to 125° C. The two flows leaving the tanks can be measured by means of a proper device, mixed together in the desired ratios and fed to the mould. Polymerization (and subsequent crystallization) occur in the mould, previously heated to a temperature of 130°-170° C., preferably of 130°-160° C., in a few minutes. If the process is conducted at a lower temperature than the polyamide softening point, the polymer can be withdrawn without difficulty from the mould already as a finished article. Of course, polymerization (and subsequent crystallization) can be carried out in the presence of reinforcing agents, such as, for example, glass fibres or carbon fibres of various sizes, fabrics or mineral fillers, provided they behave as inert matters and do not interfere with the polymerization; the use of glass or carbon fibres, optionally sized, is particularly advantageous when the manufactured article rigidity (i.e. the flexural modulus) shall be increased.

The formulations according to the invention are particularly suited to prepare a great variety of formed articles, such as flat sheets of different thicknesses, bars, pipes, tanks and other articles, which can be painted or mass-dyes (with the help of a masterbatch) without any drawback. In particular, said formulations are suitable for producing flat parts, or in any case parts having a great linear development, parts of ships or of automobile bodies, or fixtures for shipyards, by means of casting or of rotational moulding.

The following examples are given for merely illustrative purposes and they do not limit in any manner the scope of the invention.

DEFINITIONS WHICH ARE COMMON TO ALL THE EXAMPLES

A. HDI means hexamethylene diisocyanate.
B. MDI means 4,4-methylene bis(phenylisocyanate).
C. TDI means a mixture of 2,4-toluene-diisocyanate and 2,6-toluene diisocyanate, according to a weight ratio equal to 80/20.
D. "HDI isocyanurate" means compound (I):

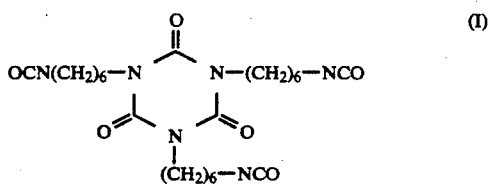

with a content of NCO groups equal to 22% by weight.
E. "Biuretized HDI" means the compound (II):

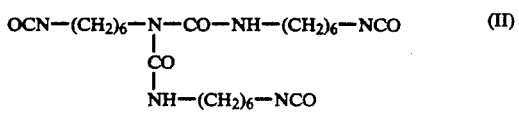

with a content of NCO groups equal to 22% by weight.
F. "Biuretized TDI" means a compound analogous with compound under point E, wherein hexamethylene group —(CH$_3$)$_6$— is substituted by a toluylene group.

G. "Partially biuretized TDI" means a compound analogous with compound under point F, wherein the biuretization is not complete and wherein the content of NCO groups, referred to the total amount of TDI, either or not biuretized, is equal to 40% by weight.

H. "Biuretized MDI" means a compound analogous with the compound under point E, wherein the hexamethylene group is substituted by a 4,4'-methylene-bisphenylene group.

K. "Partially biuretized MDI" means a compound analogous with the compound under point H, wherein biuretization is not complete and wherein the content of NCO groups, referred to the total MDI amount, either or not biuretized, is equal to 27% by weight.

J. HDT (Heat Distortion Temperature) means the minimum thermoplastic deformation temperature, determined (on the dry product) according to USA standards ASTM-D-648 (at 1.83 MPa).

L. The term "resiliency" means the IZOD resiliency, determined by means of the notched-bar test on the dry product, at 23° C., according to USA standards ASTM-D-256.

M. The term "Flexural Modulus" means the flexural elastic modulus, determined on the dry product, at 23° C., according to USA standard ASTM-D-790.

N. The term "Relative Viscosity" means the viscosity (relative to the used solvent) of a solution containing 1 g of polymer dissolved in 100 cm$^3$ of aqueous sulphuric acid (at 95.6% by weight H$_2$SO$_4$).

P. The Yellow Index was determined according to standards ASTM D 1925/70.

Note: - In all the tests it was possible to observe a spontaneous detaching of the article from the mould (at the end of the polymerization and of the successive crystallization); in other words: it was operated for a time long enough to complete the polymerization and to permit the subsequent crystallization of the product, which causes a contraction of the volume and therefore a spontaneous detaching from the mould walls.

EXAMPLE 1

In a jacketed heated tank (A), equipped with a stirrer and a bottom discharge, 549 g of caprolactam, 66 g of a solution of Na-caprolactamate in caprolactam (at 20% by weight) and 440 g of JEFFAMINE D 2000, a polyoxypropylene diamine marketed by Texaco Co., having a molecular weight equal to about 2000, were molten and brought to 110° C., in a nitrogen atmosphere. In an analogous tank (B), 908.6 g of caprolactam and 191.4 g of hexamethylene diisocyanate blocked with caprolactam (pure diisocyanate=33% by weight) were molten and brought to 110° C. (in a nitrogen atmosphere). The content of (A) and the content of (B) were mixed and the resulting product was transferred into a cylindrical mould, heated to 150° C., having a diameter of 15 cm and a height of 13 cm; after 40 minutes, a block of modified polyamide 6 detached spontaneously and was easily withdrawn from the mold, the block being allowed to gradually cool in a heat-insulated container. The formed article was then cut and the inner sections appeared homogeneous, free from cavities and cracks; the appearance was good, i.e. the surface was smooth and bright. From the articles, samples were obtained, which were useful to determine the relative viscosity (at 20° C.) of a polymer solution at 1% (weight by volume) in H$_2$SO$_4$ at 95.6%, as well as the residual caprolactam content (1.4% by weight), by means of gas-liquid chromatography (GLC) of a polymer solution in CF$_3$CH$_2$OH; the results are indicated in Table 1.

EXAMPLES 2 AND 3

Example 1 was repeated but varying the amounts of Na-caprolactamate and of hexamethylene diisocyanate blocked with caprolactam, as well as the molding temperatures and the component mixing temperatures; compositions, withdrawing time of the article and characteristics of the resulting polymers are indicated in Table 1.

EXAMPLES 4 TO 4 (COMPARATIVE TESTS)

Examples 1 was repeated, employing a component mixing temperature equal to or lower than 100° C.; the polymer so obtained exhibited cavities and cracks in the inside and/or a wax-like outer surface. These defects prevented the use of the product as such, as well the use of the semifinished products obtained therefrom; the results are reported in Table 1.

EXAMPLES 7 TO 26

Tables from 2 to 6 indicate the compositions, mixing temperatures and temperatures of the mould used for each example, as well as the chemical and physical characteristics of the solid large-size manufactured articles so obtained; the operative methodology was in according with example 1.

TABLE 1

| EXAMPLE | | 1 | 2 | 3 | 4** | 5** | 6** |
|---|---|---|---|---|---|---|---|
| caprolactam | (% by weight) | 68.3 | 68.5 | 73.0 | 68.3 | 68.3 | 67.3 |
| Na-CPL (at 20% in CPL) | (% by weight) | 3.0 | 4.5 | 1.5 | 3.0 | 3.0 | 3.0 |
| HDI (at 33% in CPL) | (% by weight) | 8.7 | 7.0 | 5.5 | 8.7 | 8.7 | 8.7 |
| JEFFAMINE D 2000 | (% by weight) | 20.0 | 20.0 | 20.0 | 20.0 | 20.0 | 20.0 |
| T of the mixer | (°C.) | 110 | 110 | 110 | 90 | 100 | 95 |
| T of the mould | (°C.) | 150 | 150 | 140 | 150 | 130 | 150 |
| time | (minutes) | 40 | 40 | 35 | 40 | 30 | 40 |
| aspect: outer | | good | good | acceptable | good | good | good |
| inner | | homogeneous | homogeneous | homogeneous | *** | *** | *** |
| resiliency | (J/m) | — | — | 168 | — | — | — |
| flexural modulus | (MPa) | — | — | 1615 | — | — | — |
| HDT | (°C.) | — | — | n.d. | — | — | — |
| residual CPL | (% by weight) | 1.4 | 0.9 | 1.4 | — | — | — |
| viscosity* | (a 20 C.) | 2.3 | 2.2 | 2.0 | — | — | — |

TABLE 1-continued

| EXAMPLE | 1 | 2 | 3 | 4** | 5** | 6** |
|---|---|---|---|---|---|---|
| yellow index | — | — | −16 | — | — | — | n.d. = not determined.
*relating to the utilized solvent.
**comparative test.
***very bad (presence of cracks and cavities)

TABLE 2

| EXAMPLE | | 7 | 8 | 9 | 10 |
|---|---|---|---|---|---|
| caprolactam | (% by weight) | 59 | 59 | 56.5 | 59 |
| Na-CPL (at 20% in CPL) | (% by weight) | 6 | 6 | 6.0 | 6 |
| TDI (at 20% in CPL) | (% by weight) | 15 | 15 | 17.5 | 15 |
| JEFFAMINE D 2000 | (% by weight) | 20 | 20 | 20.0 | 20 |
| T of the mixer | (°C.) | 110 | 120 | 120 | 125 |
| T of the mould | (°C.) | 150 | 150 | 150 | 150 |
| time | (minutes) | 120 | 120 | 100 | 65 |
| aspect: outer | | good | good | good | good |
| inner | | homogeneous | homogeneous | homogeneous | homogeneous |
| resiliency | (J/m) | 248 | 235 | 293 | 365 |
| flexural modulus | (MPa) | 1423 | 1459 | 1323 | 1322 |
| HDT | (°C.) | n.d. | 65 | n.d. | n.d. |
| residual CPL | (% by weight) | 1.5 | 1.2 | 1.7 | 1.9 |
| relative viscosity | (20° C.) | 1.9 | 3.0 | 2.0 | 2.3 | n.d. = not determined.

TABLE 3

| EXAMPLE | | 11 | 12 | 13 | 14 |
|---|---|---|---|---|---|
| caprolactam | (% by weight) | 52.6 | 62.1 | 56 | 47.0 |
| Na-CPL (at 20% in CPL) | (% by weight) | 6.0 | 6.0 | 6 | 6.0 |
| MDI (at 20% in CPL) | (% by weight) | 21.4 | — | — | — |
| TDI (at 20% in CPL) | (% by weight) | — | 7.5 | — | — |
| HDI (at 33% in CPL) | (% by weight) | — | 4.4 | — | — |
| partially biuretized TDI (at 20% in CPL) | (% by weight) | — | — | 18 | — |
| partially biuretized MDI (at 20% in CPL) | (% by weight) | — | — | — | 27 |
| JEFFAMINE D 2000 | (% by weight) | 20 | 20 | 20 | 20 |
| T of the ixer | (°C.) | 120 | 120 | 125 | 125 |
| T of the mould | (°C.) | 150 | 150 | 150 | 150 |
| time | (minutes) | 120 | 120 | 120 | 180 |
| aspect: outer | | good | good | good | good |
| inner | | homogeneous | homogeneous | homogeneous | homogeneous |
| resiliency | (J/m) | 300 | 548 | 431 | n.d. |
| flexural modulus | (MPa) | 1375 | 1447 | 1058 | n.d. |
| HDT | (°C.) | 65 | 63 | n.d. | n.d. |
| residual CPL | (% by weight) | 1.5 | 1.2 | 1.8 | n.d. |
| relative viscosity | (at 20° C.) | 2.0 | 2.7 | 3.2 | n.d. | n.d. = not determined.

TABLE 4

| EXAMPLE | | 15 | 16 | 17 | 18 | 19 | 20 |
|---|---|---|---|---|---|---|---|
| caprolactam | (% by weight) | 48.5 | 44.5 | 44.5 | 44.5 | 88.5 | 19.2 |
| Na-CPL (at 20% in CPL) | (% by weight) | 3.0 | 3.0 | 3.0 | 3.0 | 1.5 | 0.8 |
| HDI isocyanurate (at 20% in CPL) | (% by weight) | 28.5 | 32.5 | 32.5 | 32.5 | 5.0 | 40.0 |
| JEFFAMINE D 2000 | (% by weight) | 20.0 | 20.0 | 20.0 | 20.0 | 5.0 | 40.0 |
| T of the mixer | (°C.) | 105 | 105 | 105 | 110 | 110 | 105 |
| T of the mould | (°C.) | 150 | 150 | 145 | 150 | 155 | 145 |
| time | (minutes) | 33 | 33 | 47 | 50 | 48 | 55 |
| aspect: outer | | good ho- | good ho- | good ho- | good ho- | good ho- | good ho- |
| inner | | mogeneous | mogeneous | mogeneous | mogeneous | mogeneous | mogeneous |
| resiliency | (J/m) | 472 | 425 | 460 | 527 | — | — |
| flexural modulus | (MPa) | 1568 | 1393 | 1269 | 1274 | — | — |
| HDT | (°C.) | n.d. | 62 | 66 | 62 | — | — |
| residual CPL | (% in peso) | 1.0 | 1.7 | 1.6 | 1.7 | — | — |
| viscosity* | (at 20° C.) | not measurable* | see es. 15 | see es. 15 | see es. 15 | — | — |
| yellow index | | −10 | −13 | −12 | −14 | — | — |

TABLE 5

| EXAMPLE | | 21 | 22 | 23 | 24 | 25 |
|---|---|---|---|---|---|---|
| caprolactam | (% by weight) | 54.5 | 52 | 48.5 | 48.5 | 48.5 |

TABLE 5-continued

| EXAMPLE | | 21 | 22 | 23 | 24 | 25 |
|---|---|---|---|---|---|---|
| Na-CPL (at 20% in CPL) | (% by weight) | 3.0 | 3 | 3.0 | 3.0 | 3.0 |
| HDI isocyanurate (at 20% in CPL) | (% by weight) | 22.5 | 25 | 28.5 | 28.5 | 28.5 |
| JEFFAMINE D 2000 | (% by weight) | 20.0 | 20 | 20.0 | 20.0 | 20.0 |
| T of the mixer | (°C.) | 105 | 105 | 105 | 105 | 105 |
| T of the mould | (°C.) | 150 | 150 | 130 | 140 | 160 |
| time | (minutes) | 55 | 44 | 40 | 45 | 60 |
| aspect: outer | | good ho- | good ho- | good ho- | good ho- | good ho- |
| inner | | mogeneous | mogeneous | mogeneous | mogeneous | mogeneous |
| resiliency | (J/m) | 205 | 231 | 260 | 247 | 335 |
| flexural modulus | (MPa) | 1546 | 1463 | 1544 | 1460 | 1391 |
| HDT | (°C.) | n.d. | n.d. | n.d. | n.d. | n.d. |
| residual CPL | (% by weight) | 1.0 | 1.1 | 1.0 | 1.1 | 1.2 |
| viscosity (see table 1) | (at 20° C.) | not measurable* | see es. 21 | see es. 21 | see es. 21 | see es. 21 |
| yellow index | | −16 | −17 | −15 | −12 | −17 |

*insoluble gel.

TABLE 6

| EXAMPLE | | 26 | 27 |
|---|---|---|---|
| caprolactam | (% by weight) | 42.0 | 43.2 |
| Na-CPL (at 20% in CPL) | (% by weight) | 5.5 | 4.3 |
| biuretized HDI (at 20% in CPL) | (% by weight) | 32.5 | 32.5 |
| JEFFAMINE D 2000 | (% by weight) | 20.0 | 20.0 |
| T of the mixer | (°C.) | 105 | 105 |
| T of the mould | (°C.) | 150 | 150 |
| time | (minutes) | 35 | 60 |
| aspect: outer | | good | good |
| inner | | homogeneous | homogeneous |
| resiliency | (J/m) | 234 | 477 |
| flexural modulus | (MPa) | 1364 | 1302 |
| HDT | (°C.) | 60 | 63 |
| residual | (% by weight) | 1.5 | 2.0 |
| viscosity (see table 1) | (at 20° C.) | 3.3 | 2.8 |
| yellow index | | — | — |

What is claimed is:

1. A process for producing molded articles consisting of a polyamide, comprising casting or rotationally molding a plymerizable mixture comprising an omega-lactam corresponding to the polyamide and:
   a) a polymerization catalyst selected from the group consisting of sodium and potassium salts of said omega-lactam and mixtures thereof containing a functional group M, where M is an alkali ion;
   b) a polyoxyalkylene polyamine having $NH_2$ terminations, as an elastomerizing agent, having a molecular weight from 400 to 5,000 and an aminic functionality substantially ranging from 1.9 to 2.5; and
   c) an activator consisting of a polyiocyanate having all the isocyanic (NCO) groups blocked with a lactam;
   wherein the reagents are distributed, prior to polymerizatio, among two distinct feeding tanks such that a part of the omega-lactam, catalyst (a) and polyoxyalkylene polyamine (b) are fed to one of said tanks, the remaining amount of omega-lactam together with activator (c) are fed to the other of said tanks, and then the contents of the respective tanks are combined to form a mixture and said mixture is fed at a temperature from 105° to 125° C. to a mold which is heated to a temperature from 130° to 170° C.

2. The process according to claim 1, wherein said polyoxyalkylene polyamine is added into a feeding tank selected from the tank containing the catalyst and the tank containing the activator.

3. The process according to claim 1, wherein said polyoxyalkylene polyamine is distributed among both feeding tanks.

4. The process according to claim 1, wherein said omega-lactam is selected from the group consisting of epsilon-caprolactam, omega-lauryl-lactam and mixtures thereof.

5. The process according to claim 3, wherein said polyoxyalkylene polyamine is a polyoxypropylene diamine having an aminic functionality substantially equal to 2 and having a molecular weight from 400 to 4,000, the amount of said diamine ranging from 1 to 60% by weight referred to the total amount of the reagents.

6. The process according claim 1, wherein the amount of said catalyst (a) ranges from 0.10 to 2 equivalents per 100 moles of lactam to be polymerized.

7. The process according to claim 1, wherein said polyisocyanate is selected from the group consisting of hexamethylene-diisocyanate (HDI); toleune-diisocyanate (TDI); methylene-bis(phenyl isocyanate) (MDI); biuretized HDI; HDI isocyanurate; partially biuretized TDI; partially biuretized MDI and corresponding mixtures.

8. The process according to claim 7, wherein said polyisocyanate is HDI isocyanurate.

9. The process according to claim 1, wherein the amount of said polyisocyanate, having blocked (NCO) groups, ranges from 0.2 to 15 equivalents per 100 moles of omega-lactam to be polymerized, corresponding to an equivalent ratio:

$$\frac{(NCO)}{(\text{omega-lactam})}$$

from 0.002 to 0.15.

10. The process according to claim 1, wherein the amounts of said polyisocyanate having all the (NCO) groups blocked, and of said polyoxyalkylene polyamine, having free (NH₂) groups, are such that the equivalent ratio:

$$\frac{(NCO)}{(NH_2)}$$

is greater than 1.

11. The process according to claim 1, wherein the amount of said omega-lactam salt having a (NM) group, where M is an alkali ion, and the amount of polyiocyanate having all the (NCO) groups blocked are such that the equivalent ratio:

$$\frac{(NCO)}{(NM)}$$

is greater than 1.

12. The process according to claim 1, wherein the equivalent ratio:

$$\frac{(NCO) - (NH_2)}{(NM)}$$

is greater than 0.01.

13. The process according to claim 1, wherein polymerization is carried out in the presence of reinforcing agents.

14. The process according to claim 1, wherein the mold temperature is from 130° to 160° C.

15. The process according to claim 5, wherein the amount of said diamine is from 3 to 40% by weight.

16. The process according to claim 5, wherein the amount of said diamine is from 5 to 25% by weight.

17. The process according to claim 6, wherein the amount of said catalyst(a) ranges from 0.5 to 1.5.

18. The process according to claim 9, wherein the amount of polyisocyanate ranges from 1 to 9 and the equivalent ratio ranges from 0.01 to 0.10.

19. The process according to claim 10, wherein the equivalent ratio ranges from 1 to 3.

20. The process according to claim 10 wherein the equivalent ratio ranges from 1.5 to 2.

21. The process according to claim 11, wherein the equivalent ratio ranges from 1 to 40.

22. The process according to claim 16, wherein the equivalent ratio ranges from 1.5 to 15.

23. The process according to claim 12, wherein the equivalent ratio ranges from 0.01 to 20.

24. The process according to claim 13, wherein the reinforcing agents are glass or carbon fibers.

* * * * *